United States Patent
Stewart et al.

(10) Patent No.: US 10,210,759 B2
(45) Date of Patent: Feb. 19, 2019

(54) SYSTEM AND METHOD FOR ENABLING AN INTEROPERABLE VEHICLE SAFETY NETWORK USING WIRELESS COMMUNICATION

(71) Applicants: Robin Hardie Stewart, Woodbridge, VA (US); Qiliang Li, Woodbridge, VA (US); Keith Dyson, Woodbridge, VA (US)

(72) Inventors: Robin Hardie Stewart, Woodbridge, VA (US); Qiliang Li, Woodbridge, VA (US); Keith Dyson, Woodbridge, VA (US)

( * ) Notice: Subject to any disclaimer, the term of this patent is extended or adjusted under 35 U.S.C. 154(b) by 0 days.

(21) Appl. No.: 15/617,370

(22) Filed: Jun. 8, 2017

(65) Prior Publication Data
US 2017/0358210 A1   Dec. 14, 2017

Related U.S. Application Data

(60) Provisional application No. 62/496,216, filed on Oct. 11, 2016, provisional application No. 62/392,653, filed on Jun. 8, 2016.

(51) Int. Cl.
*G08G 1/16* (2006.01)
*B60R 21/00* (2006.01)
*G06K 9/00* (2006.01)

(52) U.S. Cl.
CPC .............. *G08G 1/16* (2013.01); *B60R 21/00* (2013.01); *G06K 9/00771* (2013.01); *G08G 1/161* (2013.01); *B60R 2021/0027* (2013.01)

(58) Field of Classification Search
CPC .......... G08G 1/16; G08G 1/161; B60R 21/00; B60R 2021/0027; G06K 9/00771
See application file for complete search history.

(56) References Cited

U.S. PATENT DOCUMENTS

| | | | |
|---|---|---|---|
| 6,791,471 B2* | 9/2004 | Wehner | G01S 5/0072 340/438 |
| 9,432,828 B1* | 8/2016 | Tu | H04W 4/22 |
| 2010/0219944 A1* | 9/2010 | McCormick | G07C 5/008 340/436 |
| 2012/0306663 A1* | 12/2012 | Mudalige | G08G 1/163 340/903 |

(Continued)

*Primary Examiner* — Brian Wilson
(74) *Attorney, Agent, or Firm* — Monarch IP Group, PLLC; April M. Mosby

(57) ABSTRACT

A method for enabling an interoperable vehicle safety network using wireless communication makes use of multiple traffic-monitoring devices that wirelessly communicate with each other. Each traffic-monitoring device records time-dependent inertial (TDI) data to determine a current trajectory. The TDI data includes current location, current velocity, and current orientation information. This information is used to monitor the current trajectory of each traffic-monitoring device and to predict the future position of each traffic-monitoring device. The trajectory of traffic-monitoring devices that are nearby to each other are analyzed to determine if there is a possibility of the devices colliding. If there is a possibility of the traffic-monitoring devices colliding, an alert is generated to prevent the collision. Additionally, the traffic-monitoring device sends out an emergency message if an accident actually occurs.

19 Claims, 17 Drawing Sheets

(56) References Cited

U.S. PATENT DOCUMENTS

| | | | |
|---|---|---|---|
| 2013/0293394 A1* | 11/2013 | Rubin | G08G 9/02 340/902 |
| 2015/0274072 A1* | 10/2015 | Croteau | E21F 11/00 340/903 |
| 2016/0027299 A1* | 1/2016 | Raamot | G08G 1/08 340/917 |
| 2017/0236423 A1* | 8/2017 | Bowers | G08G 1/166 340/903 |
| 2017/0256167 A1* | 9/2017 | Kim | G08G 1/096783 |

* cited by examiner

SYSTEM AND METHOD FOR ENABLING AN INTEROPERABLE VEHICLE SAFETY NETWORK USING WIRELESS COMMUNICATION

The current application claims a priority to the U.S. Provisional Patent application Ser. No. 62/392,653 filed on Jun. 8, 2016 and a priority to the U.S. Provisional Patent application Ser. No. 62/496,216 filed on Oct. 10, 2016.

BACKGROUND OF THE INVENTION

Currently, vehicles do not communicate with each other. Because of this, the burden of preventing a traffic accident falls entirely onto the human operator of a vehicle. Studies have shown that the overwhelming majority of traffic accidents occur due to human error. Because of the fallibility of humans, the traditional method of operating vehicles on the road is inherently unsafe. The problem is compounded when cars and bikes share the road. Because bikes are smaller than traditional motor vehicles, drivers are less likely to see a bike rider while maneuvering on the road. Additionally, a bike rider does not have the same vantage point as a driver, and thus cannot always see when a vehicle is headed toward a collision.

SUMMARY

The system for communication relates generally to a wireless vehicle communication system. More specifically, the system described herein relates to a system that detects the orientation and trajectory of a group of vehicles within an area of interest, and then uses this information to prevent traffic collisions that may happen, or to alert emergency personnel of an accident that has already occurred. The system and method for enabling an interoperable vehicle safety network using wireless communication; addresses the above described issues by creating a network that enables motor vehicles and bikes to communicate while on the road. This system gathers the position and trajectory of all the vehicles on the road and predicts the possibility that an accident will occur. Additionally, the method for enabling an interoperable vehicle safety network generates alerts that notify bikers and motor vehicle operators of impending collisions. Thus notified, the vehicle operators are able to act accordingly and prevent collisions. In addition to alerting bikers of possible collisions, this system and method for enabling an interoperable vehicle safety network enables bikers to activate crosswalks and stop intersecting traffic. Furthermore, the system described herein is designed to capture data that detects the occurrence of a traffic accident and then transmit this data to friends, family, and emergency response services. Finally, the system and method of communication is designed to work with subscription services that charge the user fees to ensure access to the network of other users who employ the method described herein to prevent collisions.

As an example of how to specifically implement the present invention, the mobile device that is used by a human operator is seen as a black box that records data and functions as the primary source of traffic monitoring and collision avoidance data. As such, the black box is a camera unit that can be attached to a bike, stroller, or runner's body. The black box unit will be able to connect to the user's cellphone using a Bluetooth connection that will pass data packets holding photos. The black box will have an accelerometer for double redundancy to detect abrupt changes in velocities to trigger the camera. The cell phone will have an interactive app with the user for user input and to allow the phone to connect to the black box.

Further expounding on this example, the stationary device that is integrated into a crosswalk is seen as a crosswalk unit. The cellphone will collect GPS units and compare the coordinates with the closest crosswalk unit. Once an accelerometer trigger is caused, a snooze option will alert the user that the emergency trigger was initiated. If the black box is not snoozed within a set amount of time, the cellphone will try to create a transmission control protocol (TCP) to the crosswalk unit to ensure no data is dropped and that the connection is secured. This protocol will also ensure that the black box data is sent and delivered. If the closest crosswalk unit is outside of the range or a secure connection cannot be established, a user data protocol (UDP) packet transfer will be established to hopefully trigger a close crosswalk unit. If a UDP transfer is initiated, the cellphone will also connect to the telecommunication network to alert the emergency contacts. These packets will use an IPv6 packet format to send data packets throughout the system.

Furthermore, each crosswalk unit will have IP addresses assigned within the system using a static method of assigning IP addresses so that communication between any cellphone and crosswalk unit can be established. This assignment will be a protected data structure below the known GPS coordinate within the system. An open shortest path first protocol and a border gateway protocol will be used to route the data packets to the crosswalk units. Once the crosswalk unit receives a packet from a user/cell phone, the camera will be triggered and both the user data and crosswalk data will be packaged and sent using an LTE connection to the telecommunication network. From the telecomunication networks, emergency contacts will be alerted by text or voice messaging of an incident.

DETAIL DESCRIPTIONS OF THE INVENTION

All illustrations of the drawings are for the purpose of describing selected versions of the present invention and are not intended to limit the scope of the present invention.

As can be seen in FIG. 1 through FIG. 17, the present invention, the method for enabling an interoperable vehicle safety network using wireless communication, is designed to create a network of connected vehicles that prevent collisions between vehicles including, but not limited to, cars, motorcycles, busses, and bikes. Additionally, the present invention creates a communication network where users, such as bikers, pedestrians, motorcyclists, and the like can speak to autonomous and non-autonomous vehicles conveying position and speeds in order to prevent crashes. To accomplish this, the present invention employs a plurality of traffic-monitoring devices that wirelessly communicate with each other, as well as other wireless communication infrastructure including, but not limited to, cellphone towers, radio towers, and satellites (Step A). Each of the plurality of traffic-monitoring devices is a portable computing device equipped with a location-detecting system, a wireless communication system, an orientation-determining system, an image capturing system, and an alert-generating system. The location-detecting system is preferably a GPS module that is able to identify a current position, a current velocity, and a current heading of each of the plurality of traffic-monitoring device. The data acquired by the location-determining system is then wirelessly shared with each of the other traffic-monitoring devices in the plurality of traffic-monitoring devices. This enables the present invention to determine if any of the traffic-monitoring devices are in danger of colliding. This functionality is especially useful for a biker who is unable to see a vehicle moving along an intersecting trajectory. For example, the biker moving toward a traffic intersection may be unaware that a vehicle is heading toward the same traffic intersection. In this example, the present invention would calculate the possibility of a collision and alert both the biker and the vehicle operator of an impending collision and give directions on how to avoid an accident. Furthermore, the present invention makes use of the orientation-determining system, which preferably comprises a multi-axis accelerometer and gyroscope, to determine if a collision has occurred.

Figure 2:
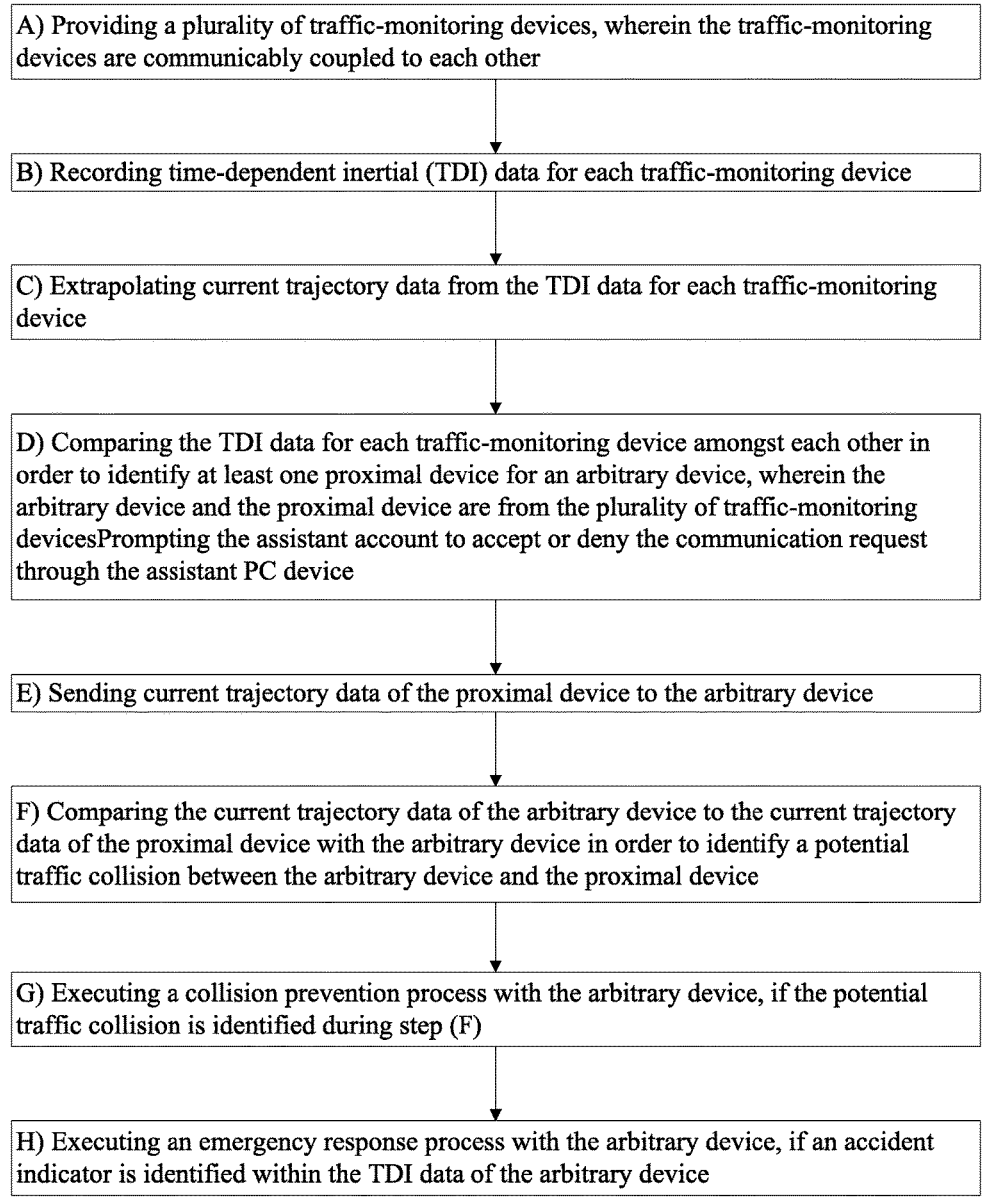
FIG. 2 is a flowchart describing the overall process followed by the method of the present invention.

As can be seen in FIG. 2, to accomplish the above described functionality, the overall process of the method of the present invention begins by recording time-dependent inertial (TDI) data for each traffic-monitoring device (Step B). The TDI data is an amalgamated dataset that is generated by the location-detecting system and the orientation-determining system. this amalgamated dataset includes a current position, a current heading, a current velocity, and a current orientation relative to the earth of each of the traffic-monitoring devices. The overall process of the method of the present invention continues by extrapolating current trajectory data from the TDI data for each traffic-monitoring device (Step C). The current trajectory data is a measure of the traffic-monitoring device's position over time. Specifically, the current trajectory is generated by analyzing the TDI data to determine the traffic-monitoring device's past position, current position, and future position. The overall process of the present invention continues by comparing the TDI data for each traffic-monitoring device amongst each other in order to identify at least one proximal device for an arbitrary device (Step D). The arbitrary device is any one of the plurality of traffic-monitoring devices that is being employed by the user. Additionally, the at least one proximal device is a collection of traffic-monitoring devices that are close enough to the arbitrary device to warrant concern of a collision. Continuing the above described example, the biker riding the street will only be concerned with the vehicles that are close enough to pose a threat. In this example, the traffic-monitoring device being used by the biker is the arbitrary device, and the traffic-monitoring device being used in the vehicle approaching the traffic intersection is the at least one proximal device. It is to be understood that the collision avoidance routines being executed by the arbitrary device are being executed by the at least one proximal device, concurrently. As a result, each of the plurality of traffic-monitoring devices functions as a collision avoidance system for the vehicle to which it is attached.

As can be seen in FIG. 2, once the proximal device is identified, the overall process of the method of the present invention continues by sending current trajectory data of the proximal device to the arbitrary device (Step E). This step begins a collision avoidance routine by enabling the arbitrary device to access the current trajectory data of the proximal device. As such, the arbitrary device is aware of the current and future positions of the proximal device. The overall process of the method of the present invention continues by comparing the current trajectory data of the arbitrary device to the current trajectory data of the proximal device with the arbitrary device, in order to identify a potential traffic collision between the arbitrary device and the proximal device (Step F). This step analyzes the current trajectory of the arbitrary device in relation to the current trajectory of the proximal device to determine if the two devices will ever be in the same position at the same time. The potential traffic collision is identified if the result of this analysis indicates that the arbitrary device and the proximal device will be in the same position at the same time. The overall process of the method of the present invention continues by executing a collision prevention process with the arbitrary device, if the potential traffic collision is identified during Step F (Step G). The collision prevention process is a collection of sub-processes that are used to notify a user of the arbitrary device of an impending collision with the proximal device. Additionally, the collision prevention process gives the user of the arbitrary device options that enable the user to actively prevent the impending collision.

As can be seen in FIG. 2, the method of the present invention is designed to initiate a process that mitigates the damage of any collision or traffic accident that may occur. To that end, the overall process of the method of the present invention continues by executing an emergency response process with the arbitrary device, if an accident indicator is identified within the TDI data of the arbitrary device (Step H). The accident indicator is a flag that is generated when the readings from the location-detecting system and the orientation-determining data satisfies the conditions known to represent an accident. For example, if the orientation-determining system determines that the biker has fallen over, then the arbitrary device will identify an accident indicator and execute the emergency response process. The emergency response process is a collection of sub-routines that are used to capture data pertaining to a collision or traffic accident. Additionally, the emergency response process is designed to transmit the captured data to emergency response services as well as friends and loved ones.

Figure 3:
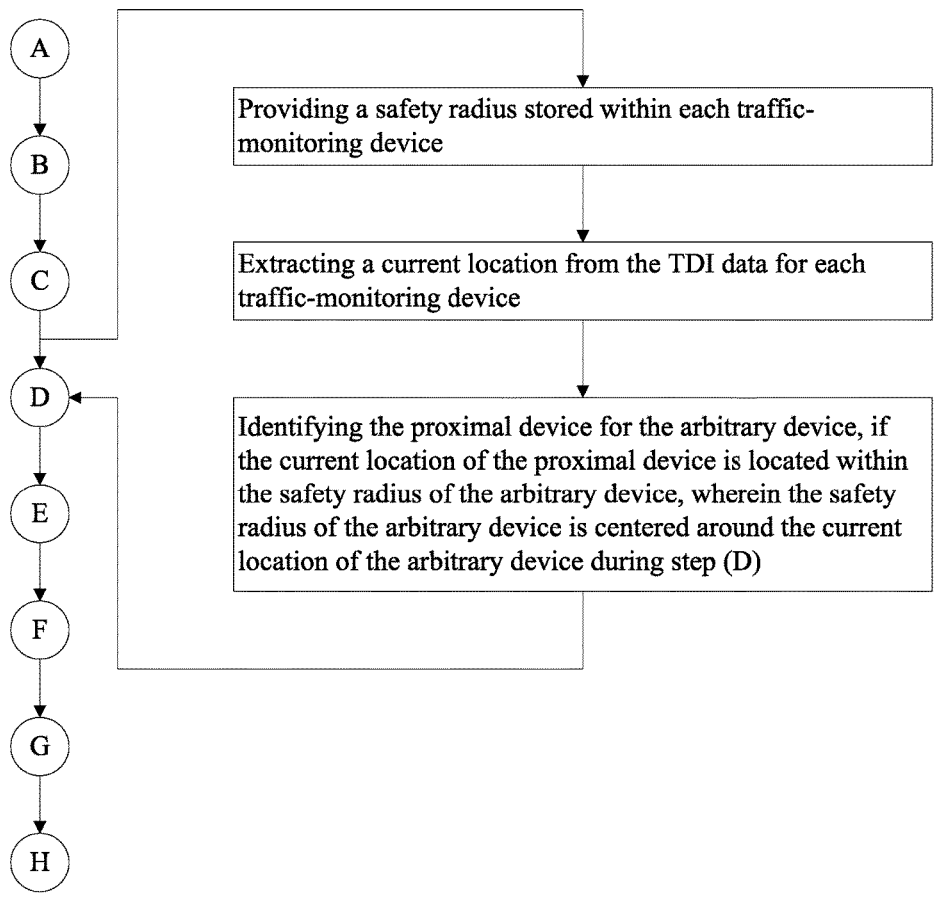
FIG. 3 is a flowchart describing a sub-process for identifying proximal devices within a safety radius through the method of the present invention.

As can be seen in FIG. 3, expounding on the process of determining if each of the plurality of traffic-monitoring devices is a proximal device, the method of the present invention includes a sub-process that begins by providing a safety radius stored within each traffic-monitoring device. The safety radius defines an area that is centered around the arbitrary device and is actively monitored for any other traffic-monitoring device. The sub-process continues by extracting a current location from the TDI data for each traffic-monitoring device. Furthermore, the sub-process continues by identifying the proximal device for the arbitrary device, if the current location of the proximal device is located within the safety radius of the arbitrary device. Any traffic-monitoring device that enters the safety device is identified as the proximal device. As such, the proximal device poses a threat of a collision with the arbitrary device. Specifically, the safety radius of the arbitrary device is centered around the current location of the arbitrary device during Step D. For example, the arbitrary device being used by the biker will not consider the traffic-monitoring device in a vehicle that is across town as a proximal device because the current trajectory of the biker and the vehicle across town may not intersect for quite some time. Conversely, the arbitrary device will identify the traffic-monitoring device in the vehicle that is approaching the same traffic intersection as the biker to be a proximal device. Additionally, if there are other vehicles on the same street as the biker, the arbitrary device will identify the traffic-monitoring devices in these vehicles as proximal devices.

Figure 4:
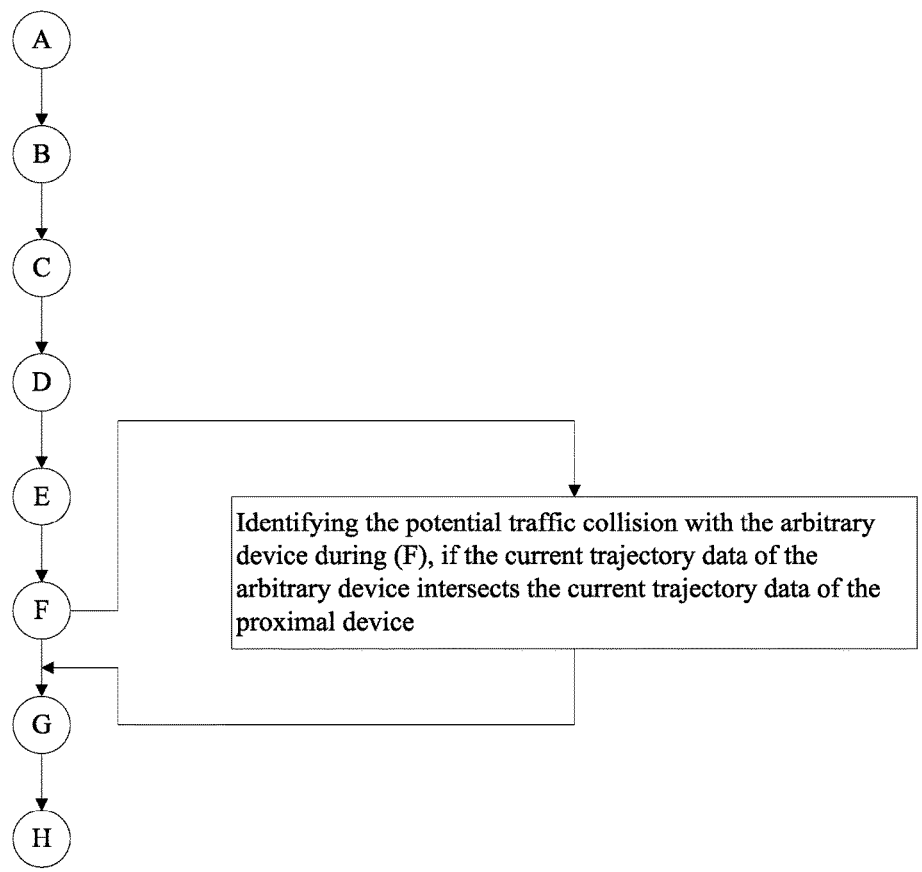
FIG. 4 is a flowchart describing a sub-process for identifying a potential collision through the method of the present invention.
Figure 5:
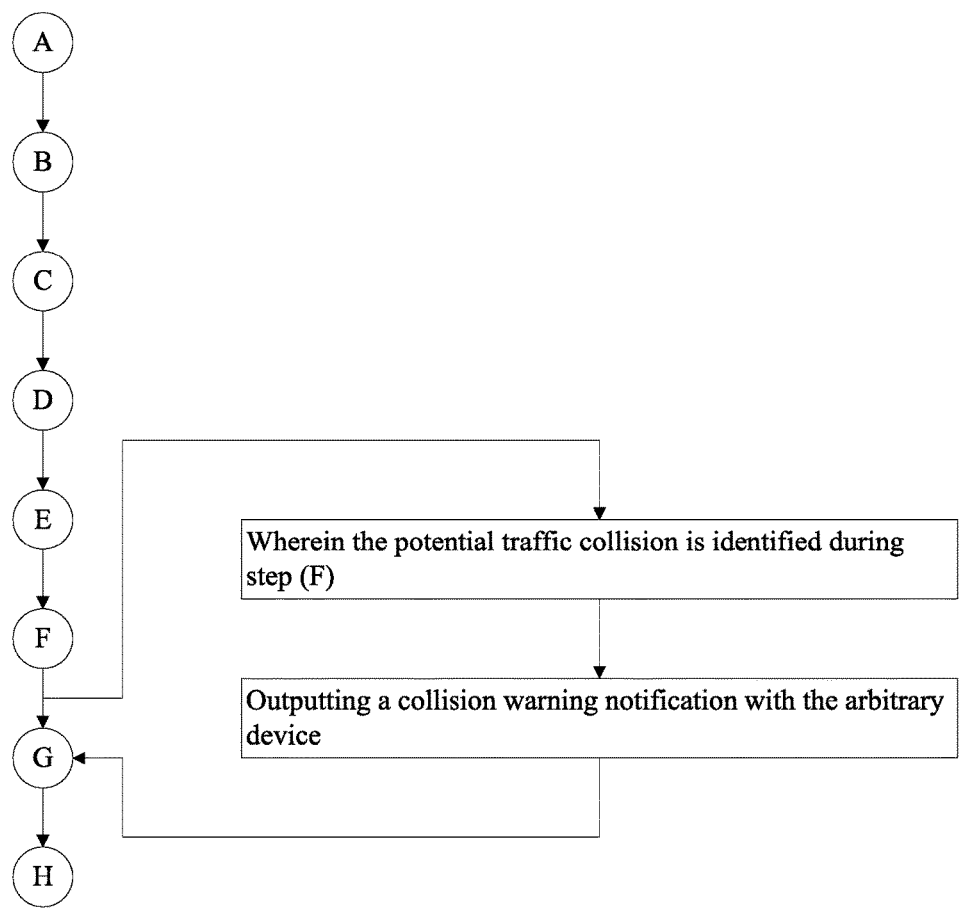
FIG. 5 is a flowchart describing a sub-process for outputting a collision warning through the method of the present invention.

As can be seen in FIG. 4 and FIG. 5, the method of the present invention includes a sub-process for identifying the potential for a traffic collision. This sub-process entails identifying the potential traffic collision with the arbitrary device during Step F, if the current trajectory data of the arbitrary device intersects the current trajectory data of the proximal device. This sub-process analyzes the future position of the arbitrary device and the future position of the proximal device to determine if the arbitrary device and the proximal device will occupy the same position at the same time. If the arbitrary device and the proximal device are determined to have intersecting trajectories then the sub-process identifies a potential traffic collision. The method of the present invention further includes a sub-process that alerts the user of the arbitrary device of an identified impending collision. This sub-process entails outputting a collision warning notification with the arbitrary device. The collision warning is an alert that is presented to the user of the arbitrary device that gives instructions on how to avoid the potential traffic collision.

Figure 6:
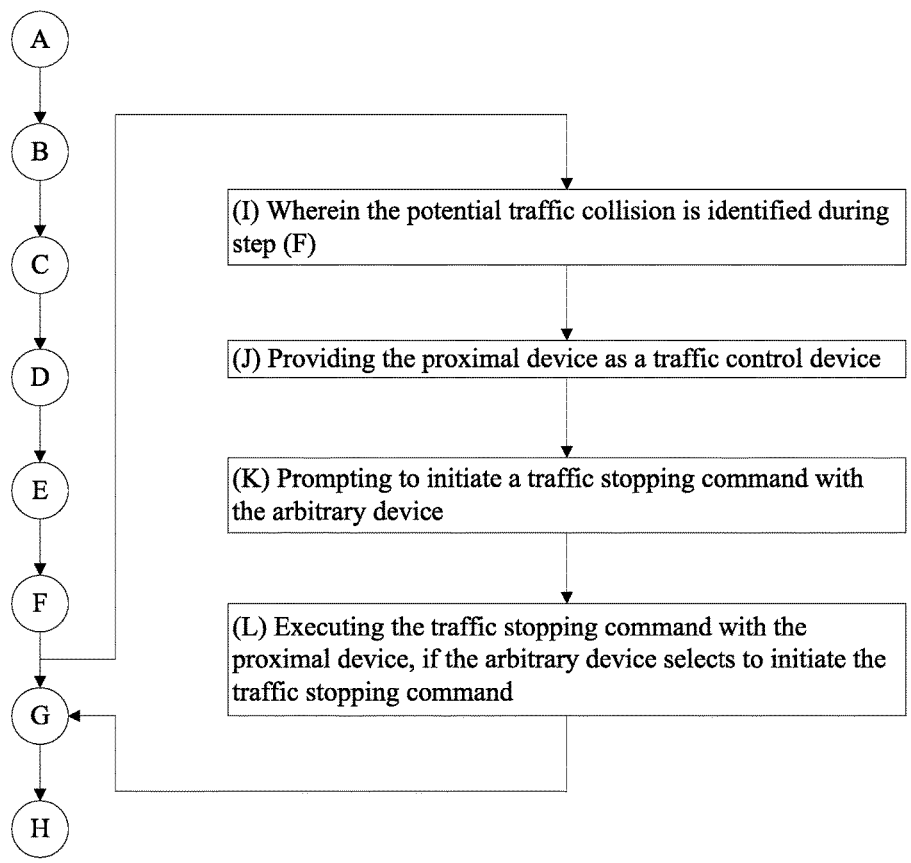
FIG. 6 is a flowchart describing a sub-process for executing a traffic stopping command through the method of the present invention.
Figure 7:
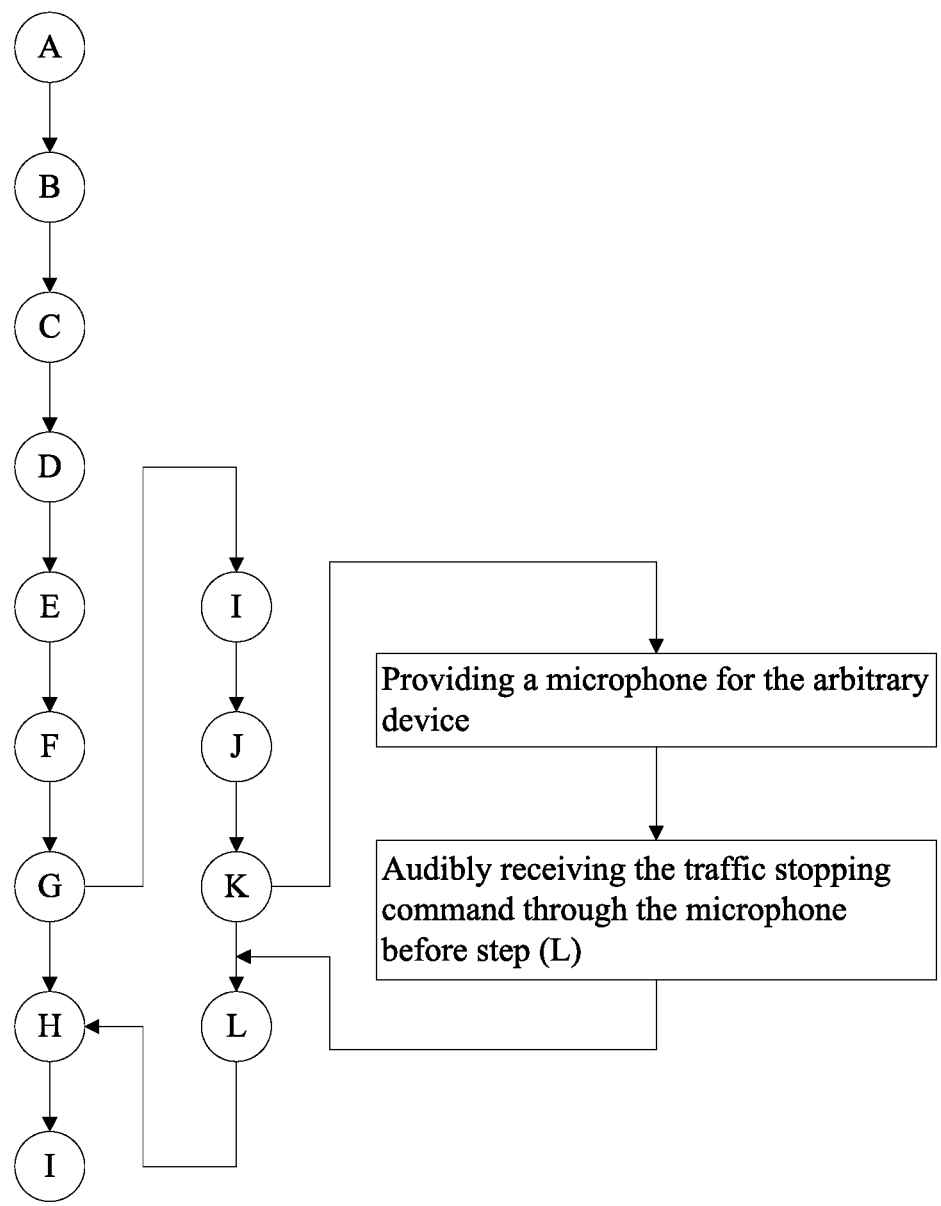
FIG. 7 is a flowchart describing a sub-process for receiving a vocal command through the method of the present invention.

As can be seen in FIG. 6, the method of the present invention is designed to enable the user of the arbitrary device to perform various actions depending on the traffic-monitoring device that is identified as the proximal device. As such, the method of the present invention includes a sub-process that is used to enable the arbitrary device to direct a traffic light or crosswalk light to stop traffic so that the arbitrary device may proceed without getting into a traffic collision. To begin this sub-process the potential traffic collision is identified during Step F (Step I). The sub-process continues by providing the proximal device as a traffic control device (Step J). The term traffic control device is used herein to refer to cross walks intersections, electric stop signs, and/or smart electronics signage. This step determines that the traffic-monitoring device is integrated into a traffic control device that is along the arbitrary device's trajectory. The present invention is designed to wirelessly link sundry vehicles and traffic control systems to form a dynamic safety network. As such, the sub-process continues by prompting to initiate a traffic stopping command with the arbitrary device (Step K). The traffic stopping command is a command that the user of the arbitrary device sends to the proximal traffic control device that directs the proximal traffic control device to stop traffic so that the arbitrary device may proceed without having a traffic collision. The sub-process continues by executing the traffic stopping command with the proximal device, if the arbitrary device selects to initiate the traffic stopping command (Step L). The user of the arbitrary device has the option to generate the traffic stopping command or not to generate the traffic stopping command. For example, if the biker is approaching an intersection and the traffic control device has already stopped traffic the biker does not have to generate the traffic stopping command. However, if the biker is approaching an intersection where traffic is flowing, the biker is given the option to generate the traffic stopping command that causes the traffic control device to stop the flow of traffic so that the biker may cross the street safely. Additionally, the traffic control device is able to transmit messages and notifications to the human operators of vehicles that are equipped with proximal devices.

Figure 1:
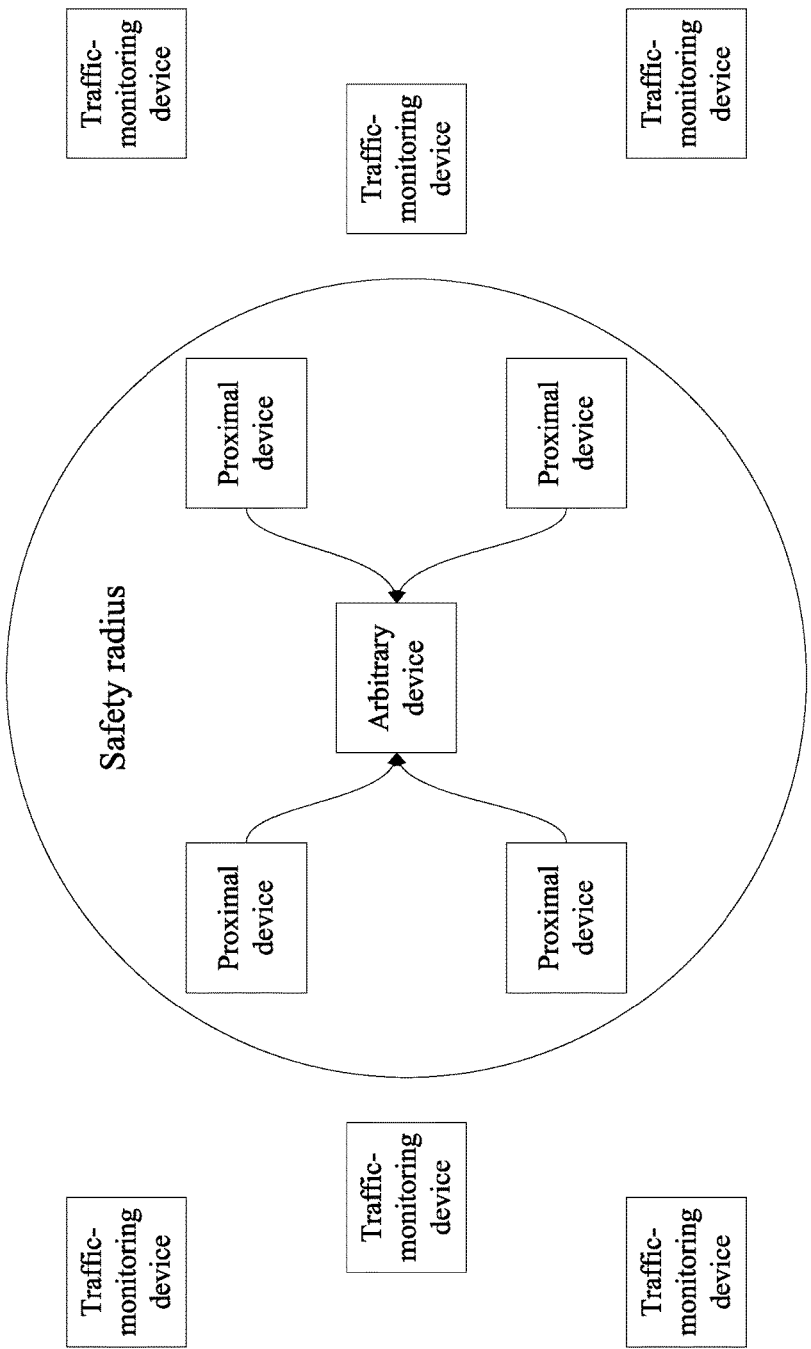
FIG. 1 is a block diagram illustrating the system overview of the present invention.
Figure 8:
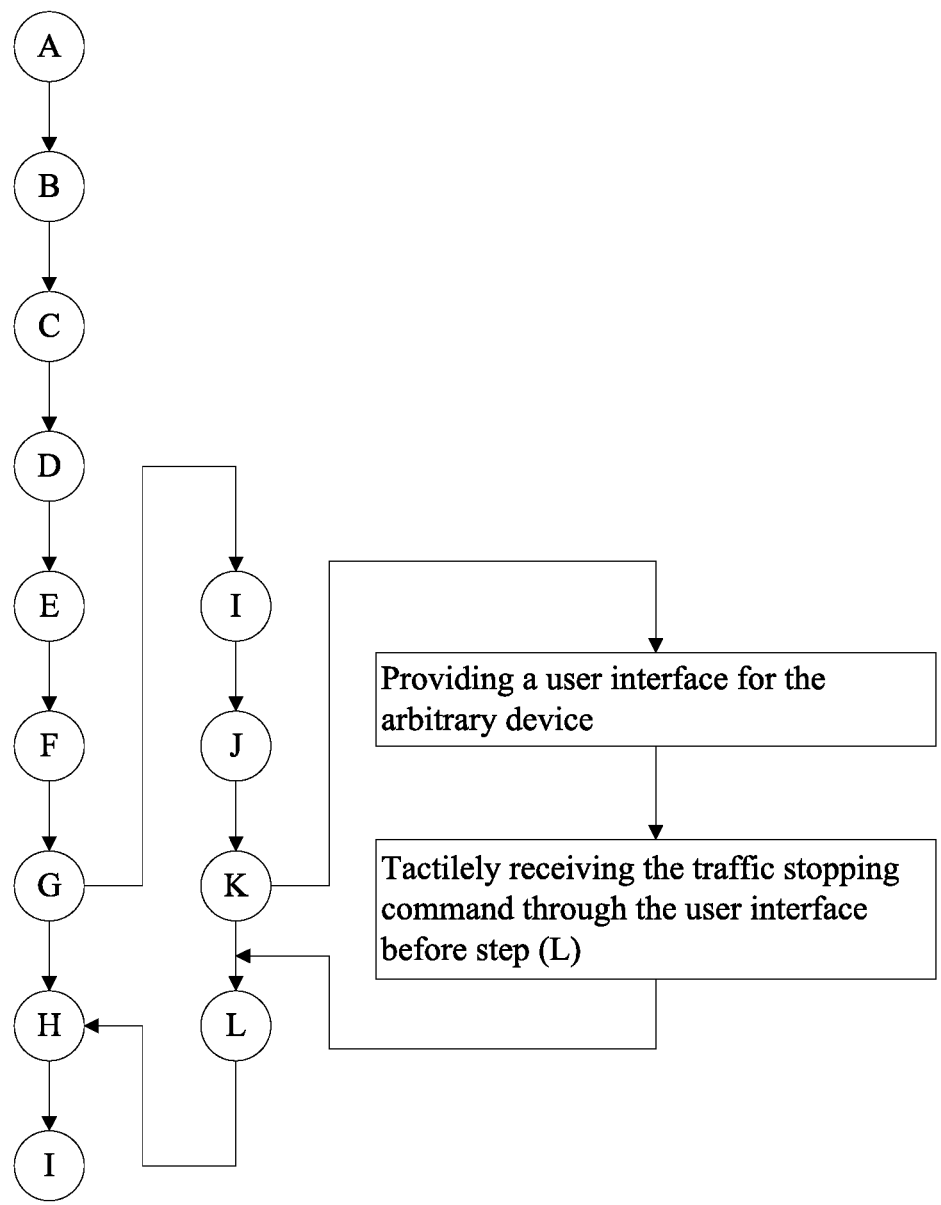
FIG. 8 is a flowchart describing a sub-process for receiving a tactile command through the method of the present invention.

As can be seen in FIG. 1 and FIG. 8, the method of the present invention is designed with sub-processes that enable the user of the arbitrary device to generate the traffic stopping command in multiple ways. For instance, if the arbitrary device is equipped with a microphone, then the sub-process entails audibly receiving the traffic stopping command through the microphone before Step L. This sub-process enables the user of the arbitrary device to issue verbal commands that are used to generate a traffic stopping command. A separate sub-process of the method of the present invention provides a user interface for the arbitrary device. The user interface is a physical controller that can be, but is not limited to, a button, a control dial, a switch, or a touchscreen interface. This sub-process entails tactilely receiving the traffic stopping command through the user interface before Step L. For example, this sub-process enables the biker to generate a traffic stopping command by pressing a button on the user interface of the arbitrary device.

Figure 9:
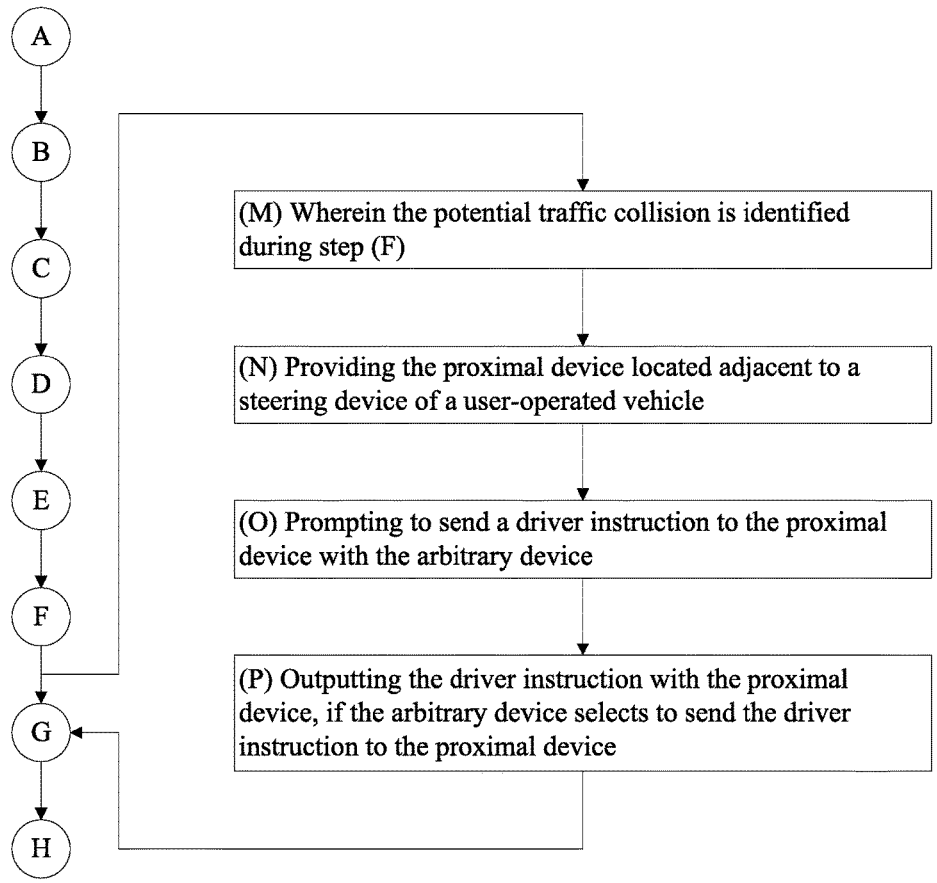
FIG. 9 is a flowchart describing a sub-process for outputting driver instructions after a potential collision has been identified through the method of the present invention.
Figure 10:
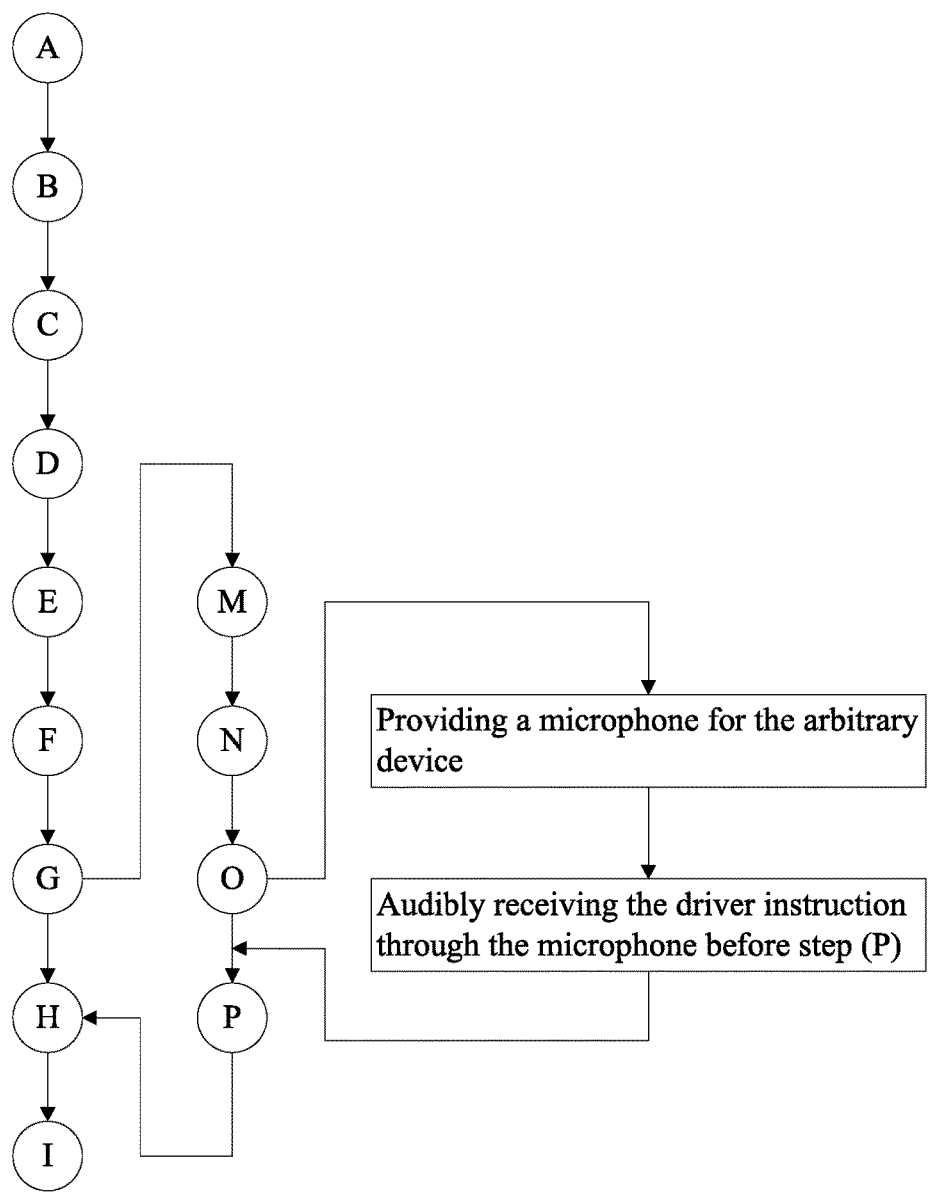
FIG. 10 is a flowchart describing a sub-process for receiving a vocal command through the method of the present invention.
Figure 11:
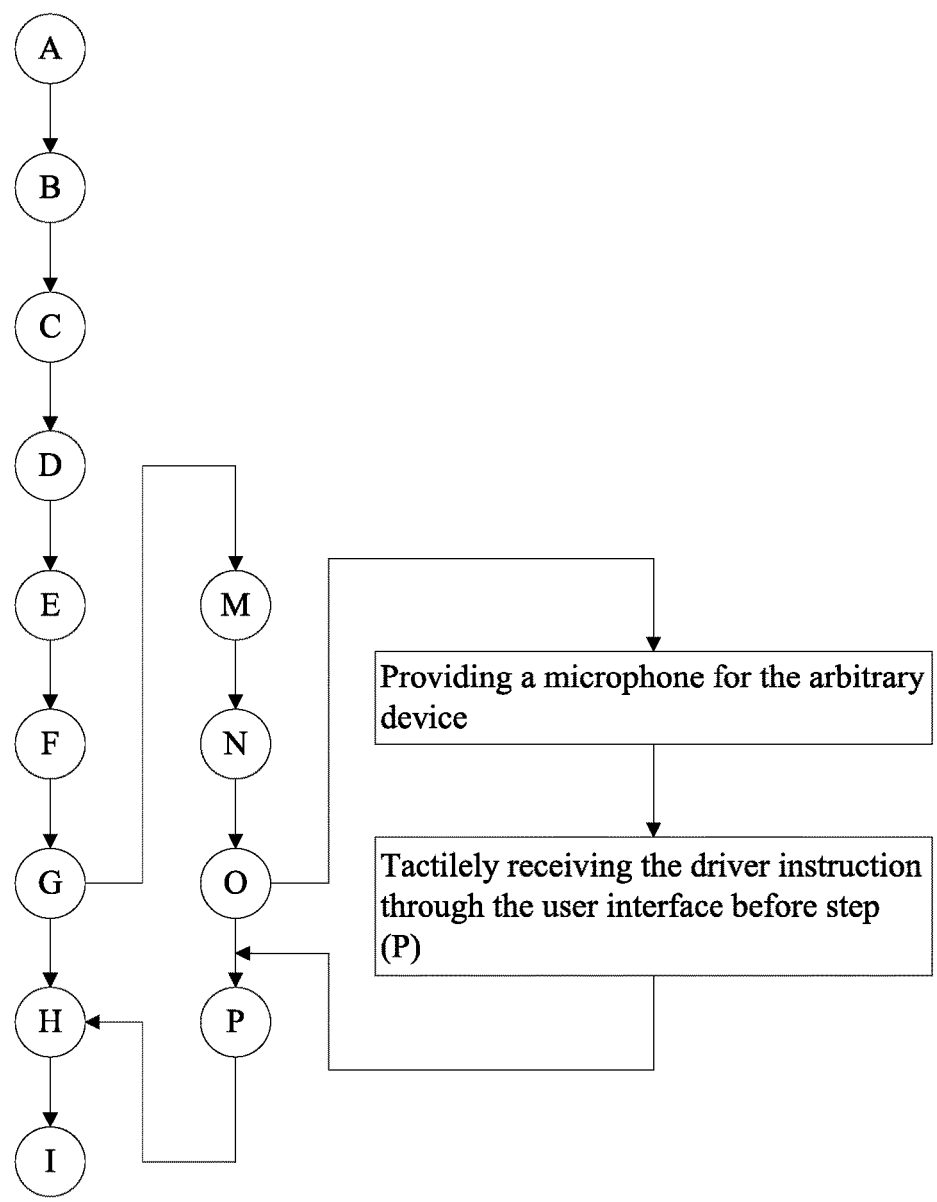
FIG. 11 is a flowchart describing a sub-process for receiving a tactile command through the method of the present invention.
Figure 12:
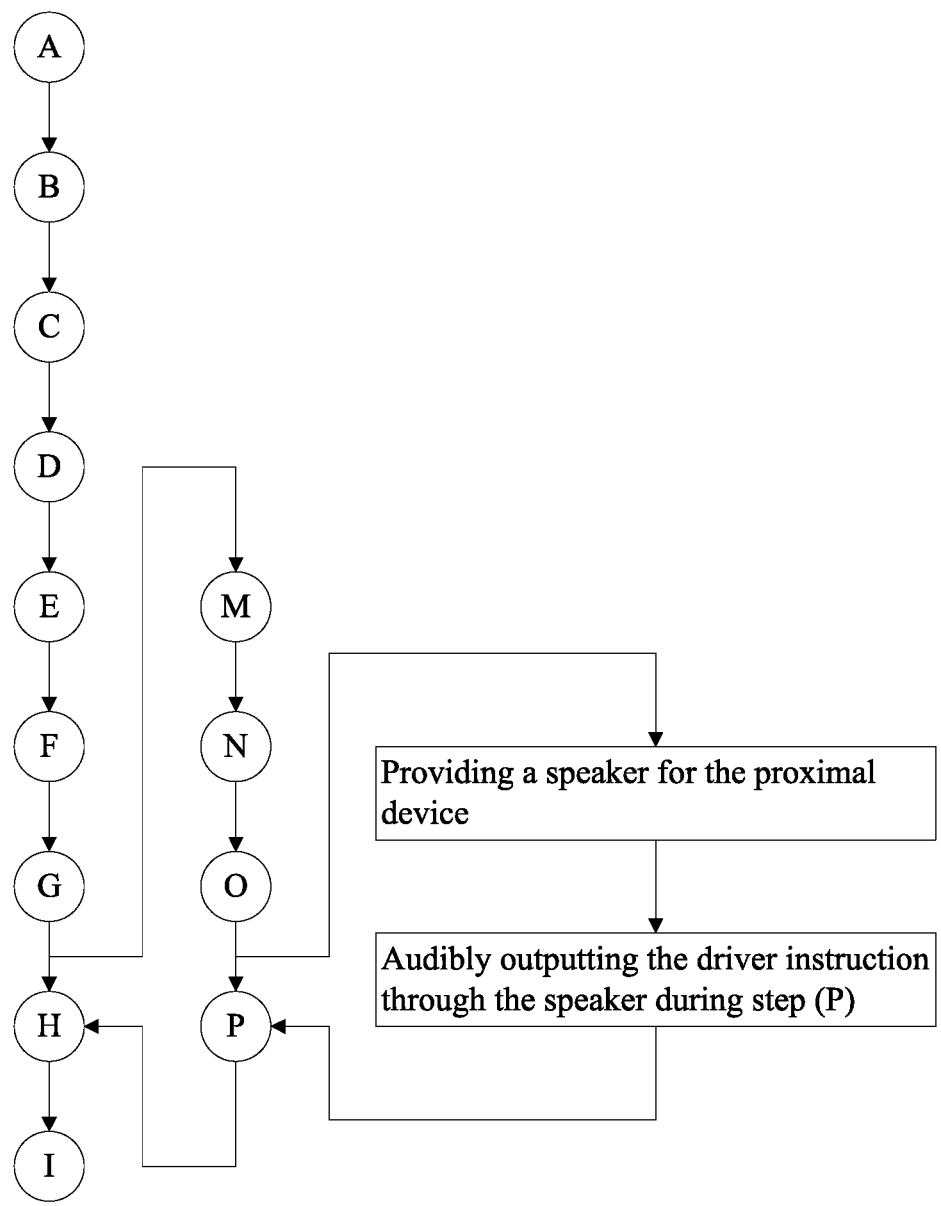
FIG. 12 is a flowchart describing a sub-process for outputting a vocal command from a proximal device through the method of the present invention.
Figure 13:
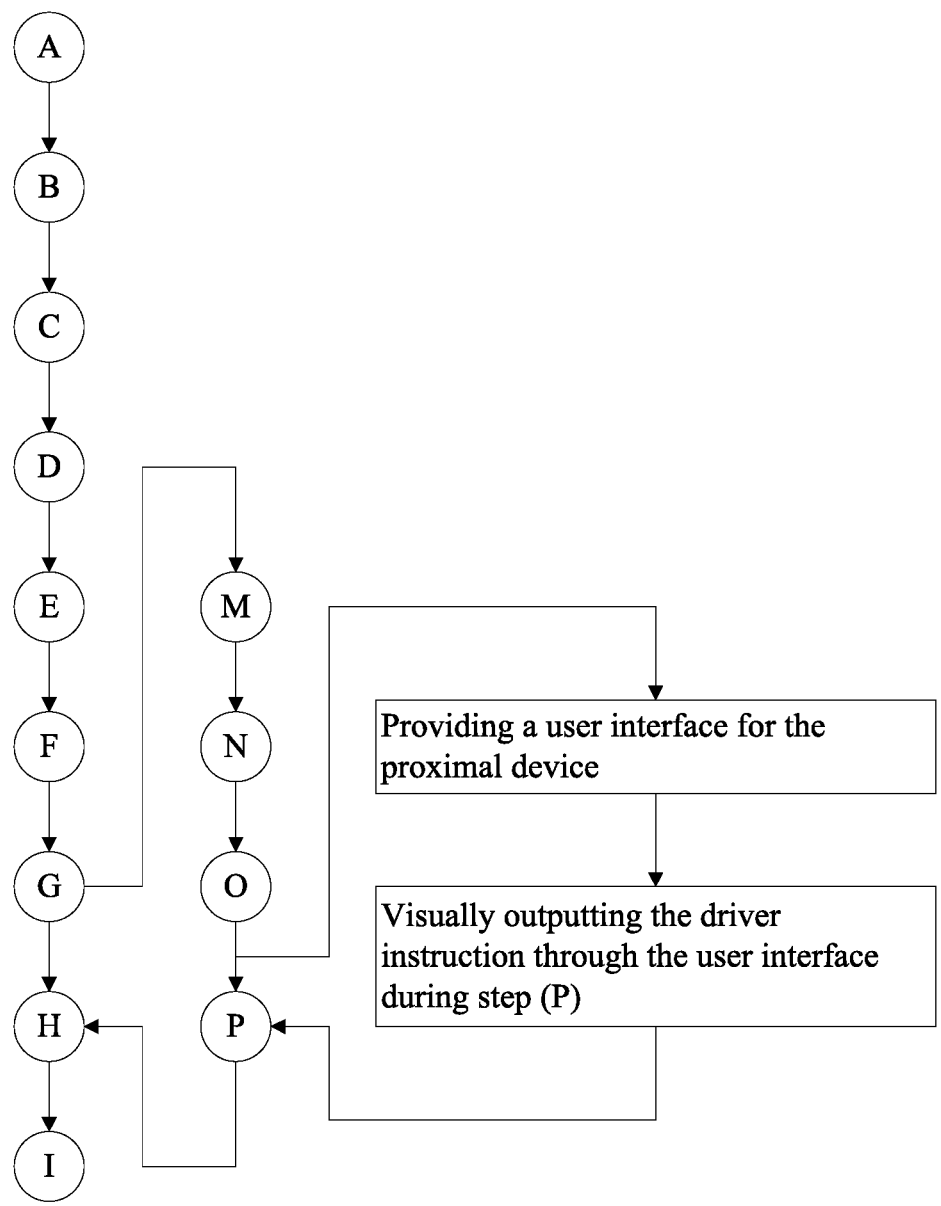
FIG. 13 is a flowchart describing a sub-process for visually outputting command from the proximal device through the method of the present invention.

As can be seen in FIG. 9, the method of the present invention is designed with a sub-process that enables the arbitrary device to communicate driver instructions to the proximal device. For example, the biker using the arbitrary device is able to say, "I'll wait for you to cross" into the arbitrary device, if a potential traffic collision is identified. This vocal message is then transmitted to the proximal device with a trajectory that was identified as causing a possible traffic collision. As a result, the biker is able to prevent a traffic collision by communicating with the operator of a vehicle using the proximal device. Additionally, the biker can select a preprogrammed audio message to the human operator of a vehicle through the proximal device. This sub-process begins after the potential traffic collision is identified during Step F (Step M). The sub-process continues by providing the proximal device located adjacent to a steering device of a user-operated vehicle (Step N). This sub-process is only enacted if the proximal device is being used in a user-operated vehicle. The steering device is a device that is used to steer the user-operated vehicle including, but not limited to, a steering wheel or a bike handle. The sub-process continues by prompting to send a driver instruction to the proximal device with the arbitrary device (Step O). The driver instruction is a message or command that the user of the arbitrary device is able to send to the proximal device to prevent a traffic collision. Step O gives the user of the arbitrary device the option to send a driver instruction, if the user deems that to be the most expedient method of avoiding a traffic collision. The sub-process continues by outputting the driver instruction with the proximal device, if the arbitrary device selects to send the driver instruction to the proximal device (Step P). This step alerts the driver of the user-operated vehicle of the proximal device's driver instruction.

As can be seen in FIG. 10 through FIG. 13, expounding on the sub-process for transmitting driver instructions to the proximal device, the method of the present invention makes use of several dependent processes for acquiring and outputting the driver instructions. In a first dependent process, the arbitrary device is designed with a microphone. This dependent process entails audibly receiving the driver instruction through the microphone before Step P. The user of the arbitrary is able to speak vocal commands into the arbitrary device through the microphone. These vocal commands are then transmitted to the proximal device as the driver instruction. In a second dependent process, the arbitrary device is designed with a user interface. This dependent process entails tactilely receiving the driver instruction through the user interface before Step P. The user of the arbitrary device enters commands into the arbitrary device through the user interface. These commands are then transmitted to the proximal device as the driver instruction. In a third dependent process, the proximal device is designed with a speaker. This dependent process entails audibly outputting the driver instruction through the speaker during Step P. The speaker lets the driver of the proximal device hear the vocal commands which were issued by the user of the arbitrary device. In a fourth dependent process, the proximal device is designed with a user interface. This dependent process entails visually outputting the driver instruction through the user interface during Step P. The user interface lets the driver of the proximal device view the driver instructions which were issued by the user of the arbitrary device.

Figure 14:
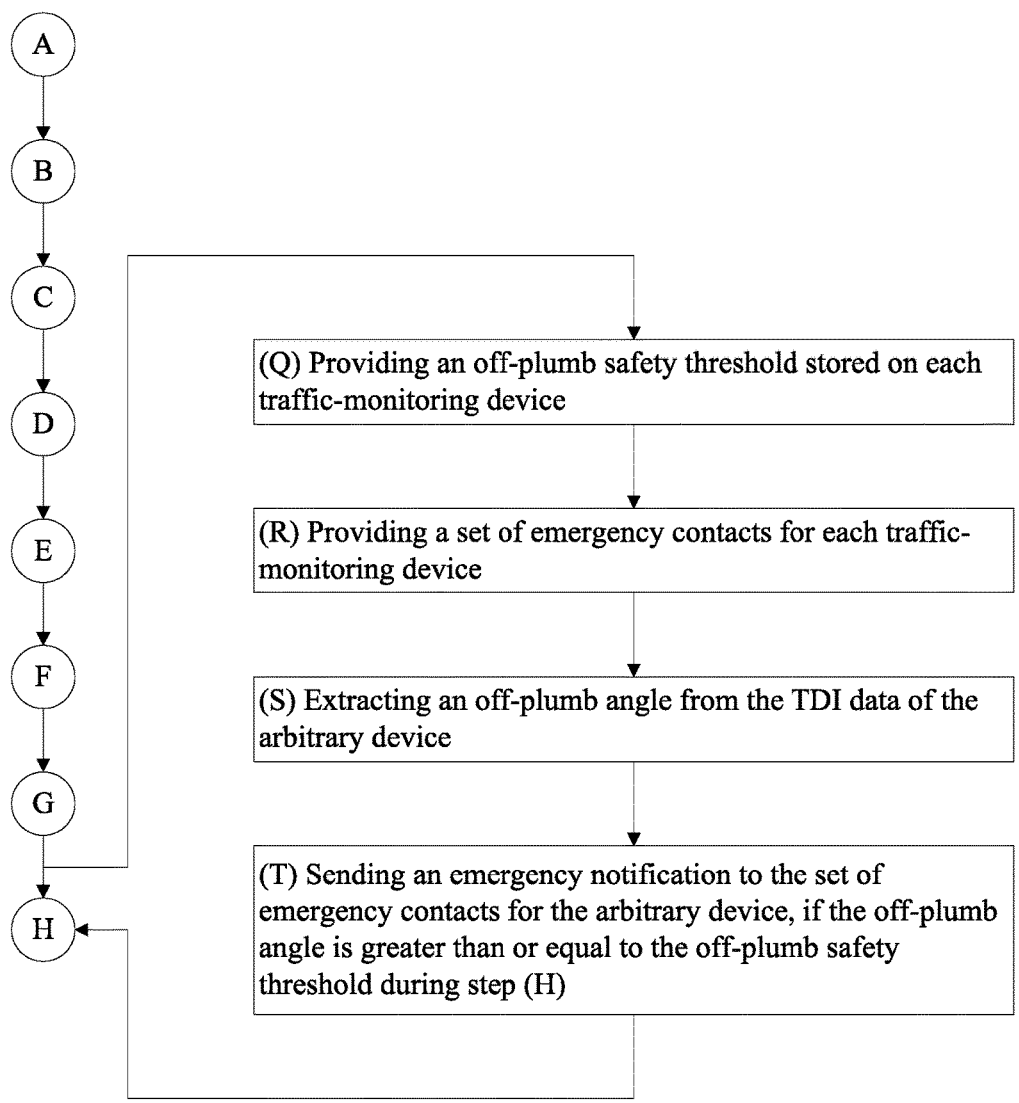
FIG. 14 is a flowchart describing a sub-process for identifying if an accident has occurred and then generating an emergency notification through the method of the present invention.

As can be seen in FIG. 14, the method of the present invention includes a sub-process that constantly monitors the orientation of the arbitrary device to determine if an accident or traffic collision as occurred. As such, the sub-process begins by providing an off-plumb safety threshold stored on each traffic-monitoring device (Step Q). The off-plumb safety threshold is a threshold angle that is used to determine the arbitrary is upright or knocked over. The sub-process continues by providing a set of emergency contacts for each traffic-monitoring device (Step R). The set of emergency contacts is the list of friends, family, and emergency response services that should be contacted in the event of a traffic collision of accident. The sub-process continues by extracting an off-plumb angle from the TDI data of the arbitrary device (Step S). The off-plumb angle is a measure of how much the arbitrary device's current orientation diverges from a completely upright orientation. The sub-process continues by sending an emergency notification to the set of emergency contacts for the arbitrary device, if the off-plumb angle is greater than or equal to the off-plumb safety threshold during Step H (Step T). The emergency notification contains data that the arbitrary device captures once the accident indicator is detected. The sub-process is used to transmit pertinent information such as location and time of accident to emergency personnel so that the damage caused by a traffic accident can be mitigated. Additionally, if the user is incapacitated, emergency personnel will have the information required to respond to the emergency in a timely manner.

Figure 15:
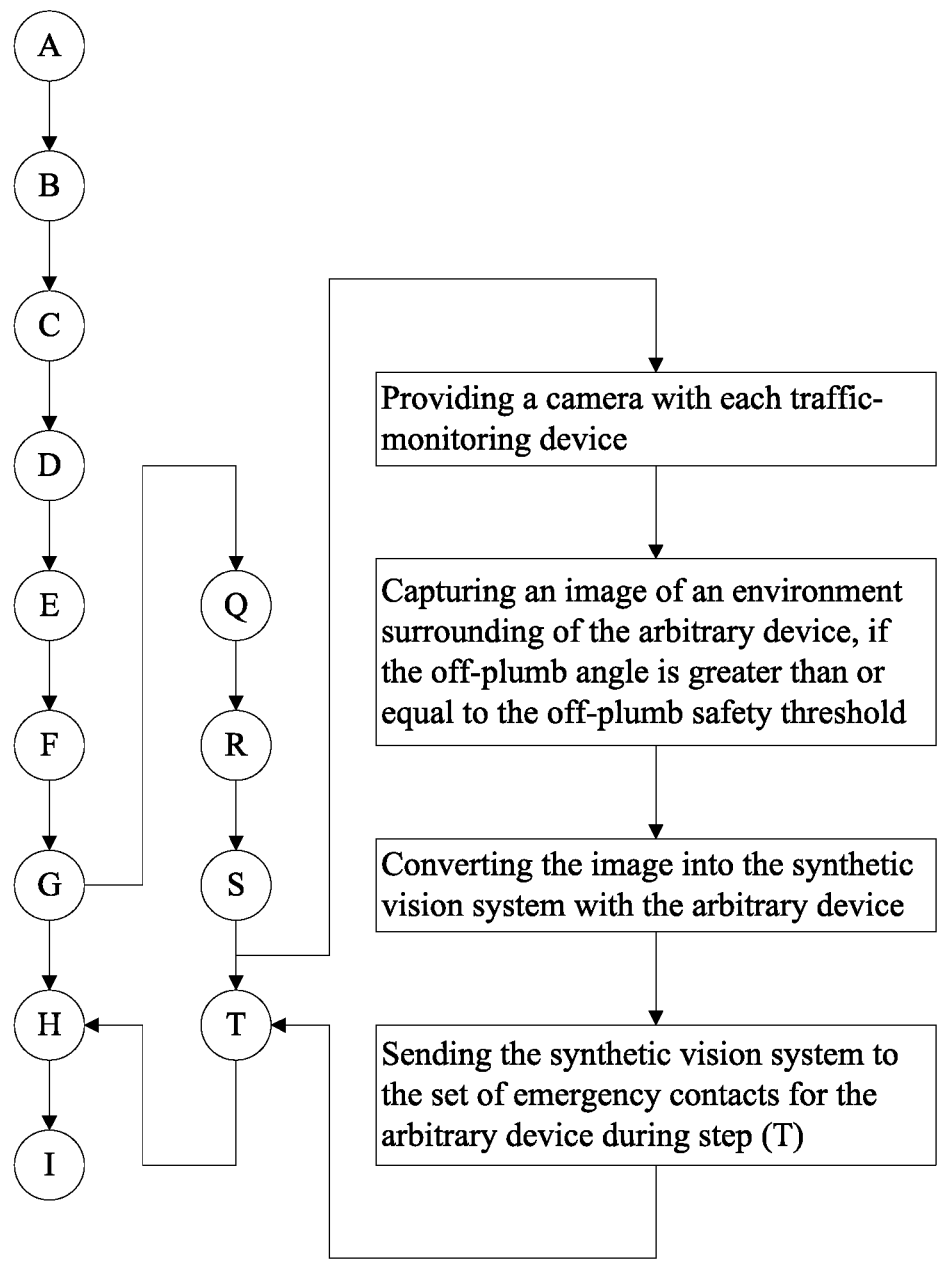
FIG. 15 is a flowchart describing a sub-process for capturing images and videos of the surrounding area after an accident has occurred through the method of the present invention.
Figure 16:
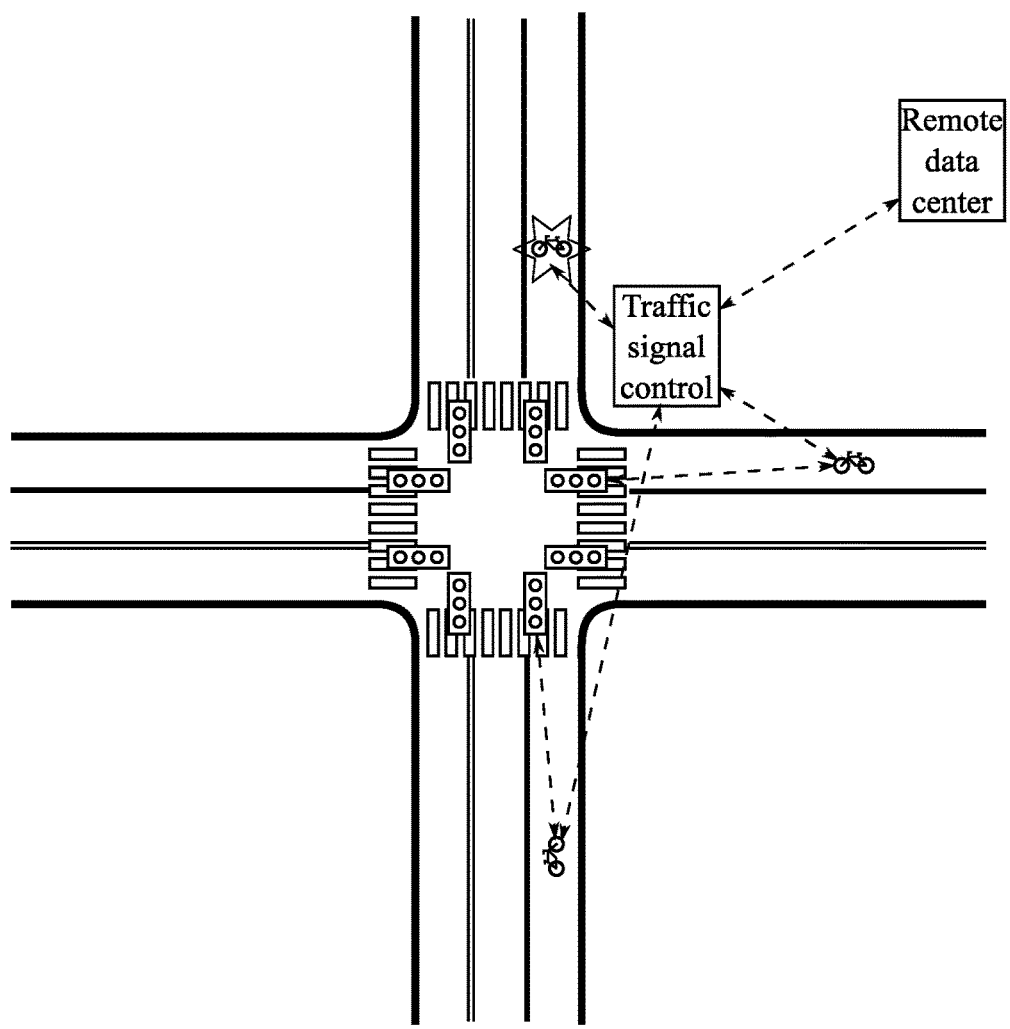
FIG. 16 is an illustration showing the network of bikes approaching an intersection where dashed lines indicate wireless communication of current trajectory and commands, and the star indicates the occurrence of a traffic accident.
Figure 17:
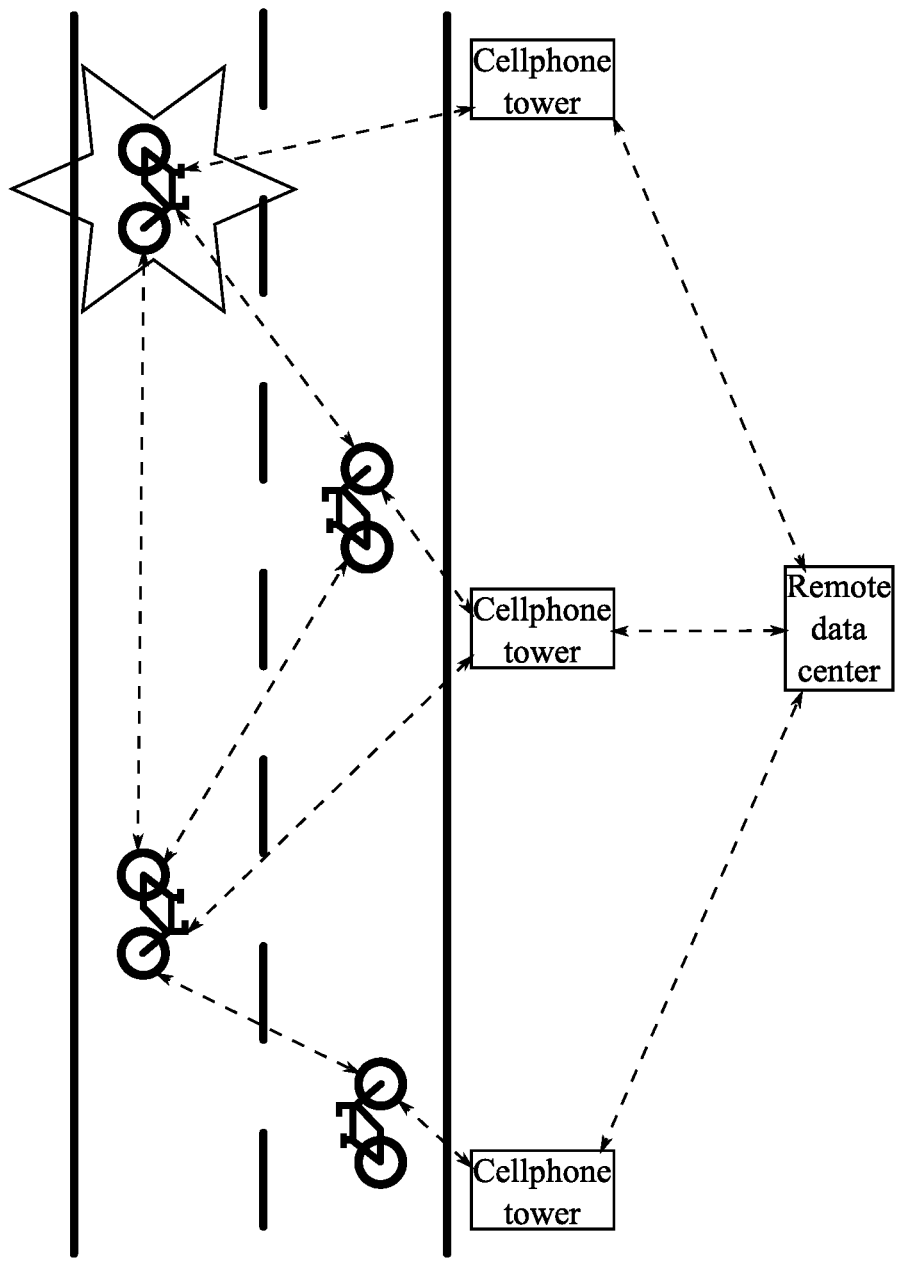
FIG. 17 is an illustration showing the network of bikes moving along a bike path where dashed lines indicate wireless communication of current trajectory and commands, and the star indicates the occurrence of a traffic accident.

As can be seen in FIG. 15, a sub-process of the method of the present invention captures a 360-degree image of the area surround the arbitrary device, if the accident indicator is identified. This sub-process begins by providing a camera that is integrated into each traffic-monitoring device. The camera is used to capture videos and images of the area around the arbitrary device in the event of an accident. As such, the sub-process continues by capturing an image of an environment surrounding of the arbitrary device, if the off-plumb angle is greater than or equal to the off-plumb safety threshold. Once the arbitrary device determines that an accident has occurred the camera captures images which are used to help emergency response personnel, friends, family, and insurance adjusters. Additionally, videos, images, and/or analytics will be sent to emergency response teams that are equipped with proximal devices once the accident indicator is identified. The sub-process continues by converting the image into the synthetic vision system with the arbitrary device. The synthetic vision system is a three-dimensional rendering of the area surrounding the arbitrary device at the time of an accident. This rendering can be overlaid onto a digital map to enhance an understanding of how and where the accident occurred. The sub-process continues by sending the synthetic vision system to the set of emergency contacts for the arbitrary device during Step T. The synthetic vision system is included in the emergency notification so that all of the emergency contacts have the requisite information to respond to the accident that has occurred.

Although the invention has been explained in relation to its preferred embodiment, it is to be understood that many other possible modifications and variations can be made without departing from the spirit and scope of the invention as hereinafter claimed.

What is claimed is:

1. A method for enabling an interoperable vehicle safety network using wireless communication, comprising:
   communicably coupling a plurality of traffic-monitoring devices to each other;

recording time-dependent inertial (TDI) data for each respective traffic-monitoring device of the plurality of traffic-monitoring devices;

generating current trajectory data associated with each respective traffic-monitoring device from the TDI data for each respective traffic-monitoring device;

comparing the TDI data for each respective traffic-monitoring device amongst each other in order to identify at least one proximal device for an arbitrary device, wherein the arbitrary device and the proximal device are selected from the plurality of traffic-monitoring devices;

sending the current trajectory data of at least one proximal device to the arbitrary device;

comparing the current trajectory data of the arbitrary device to the current trajectory data of the proximal device with the arbitrary device in order to identify a potential traffic collision between the arbitrary device and the proximal device;

generating, in response to the identified potential traffic collision, a traffic stopping command using the traffic-monitoring device of the arbitrary device, wherein the traffic stopping command instructs a traffic control device to stop traffic;

soliciting input from a user associated with the traffic-monitoring device of the arbitrary device to affirm the sending of the traffic stopping command to the traffic control device;

sending, in response to the user affirmation, the traffic stopping command to the traffic control device;

generating, in response to the traffic stopping command, a traffic light triggering signal;

sending the traffic light triggering signal to a traffic light to stop traffic; and executing an emergency response process with the arbitrary device, if an accident indicator is identified within the TDI data of the arbitrary device.

2. The method for enabling an interoperable vehicle safety network using wireless communication as claimed in claim 1, wherein comparing the TDI data for each respective traffic-monitoring device amongst each other in order to identify at least one proximal device for an arbitrary device comprises:

storing a safety radius stored within each traffic-monitoring device;

extracting a current location from the TDI data for each traffic-monitoring device; and identifying one traffic-monitoring device of the plurality of traffic-monitoring devices to be the proximal device for the arbitrary device, if the current location of the one traffic-monitoring device is located within the safety radius of the arbitrary device, wherein the safety radius of the arbitrary device is centered around the current location of the arbitrary device.

3. The method for enabling an interoperable vehicle safety network using wireless communication as claimed in claim 1, wherein comparing the current trajectory data of the arbitrary device to the current trajectory data of the proximal device comprises:

identifying the potential traffic collision using the arbitrary device, if the current trajectory data of the arbitrary device intersects the current trajectory data of the proximal device.

4. The method for enabling an interoperable vehicle safety network using wireless communication as claimed in claim 3, further comprises:

generating, in response to the identification of the potential traffic collision, a collision warning notification; and outputting the collision warning notification with the arbitrary device.

5. The method for enabling an interoperable vehicle safety network using wireless communication as claimed in claim 1, wherein the soliciting of user input comprises:

receiving an audible user verbal command through a microphone of the traffic-monitoring device associated with the arbitrary device; and generating, in response to the audible user verbal command, the traffic stopping command.

6. The method for enabling an interoperable vehicle safety network using wireless communication as claimed in claim 1, wherein the soliciting of user input comprises:

receiving a tactile command through a user interface of the arbitrary device; and generating, in response to the tactile command, the traffic stopping command.

7. The method for enabling an interoperable vehicle safety network using wireless communication as claimed in claim 1, further comprises:

generating, in response to the identified potential traffic collision, a driver instruction to avoid the identified potential traffic collision in the traffic-monitoring device associated with the arbitrary device;

providing the driver instruction to a display screen of a user interface located adjacent to a steering device of a user-operated vehicle;

prompting user input as to whether to send the driver instruction to the proximal device with the arbitrary device; and outputting, in response to a user affirmation of the prompt to send, the driver instruction with the proximal device.

8. The method for enabling an interoperable vehicle safety network using wireless communication as claimed in claim 7, wherein the prompting for user input comprises:

receiving an audible user verbal command through a microphone of the traffic-monitoring device associated with the arbitrary device; and generating, in response to the audible user verbal command, the driver instruction.

9. The method for enabling an interoperable vehicle safety network using wireless communication as claimed in claim 7, wherein the prompting for user input comprises:

receiving a tactile command through a user interface of the arbitrary device; and generating, in response to the tactile command, the driver instruction.

10. The method for enabling an interoperable vehicle safety network using wireless communication as claimed in claim 7, further comprises:

receiving the driver instruction from the arbitrary device at the proximal device; and audibly outputting the driver instruction through a speaker of the traffic-monitoring device at the proximal device.

11. The method for enabling an interoperable vehicle safety network using wireless communication as claimed in claim 7, further comprises:

receiving the driver instruction from the arbitrary device at the proximal device; and visually outputting the driver instruction through a user interface of the traffic-monitoring device at the proximal device.

12. The method for enabling an interoperable vehicle safety network using wireless communication as claimed in claim 1, further comprises:
    setting an off-plumb safety threshold stored on each traffic-monitoring device;
    storing a set of emergency contacts for each traffic-monitoring device;
    extracting an off-plumb angle from the TDI data of the arbitrary device;
    generating, in response to the extracted off-plumb angle being greater than or equal to the off-plumb safety threshold, an emergency notification; and
    sending the emergency notification to the set of emergency contacts for the arbitrary device.

13. The method for enabling an interoperable vehicle safety network using wireless communication as claimed in claim 12, further comprises:
    capturing, in response to the extracted off-plumb angle being greater than or equal to the off-plumb safety threshold, an image of an environment surrounding of the arbitrary device using a camera associated with the traffic-monitoring device;
    converting the image into a synthetic vision system within the traffic-monitoring device associated with the arbitrary device, wherein the synthetic vision system is a three dimensional rendering of the area surrounding the arbitrary device at the time of an accident; and
    sending the synthetic vision system to the set of emergency contacts for the arbitrary device.

14. A vehicle safety network system having interoperable wireless communication comprising:
    a plurality of moving objects each having a traffic-monitoring device for detecting a potential traffic collision between the plurality of moving objects, wherein a cluster of the plurality of moving objects is identified including an arbitrary object surrounded by a subset of proximal objects each within a predetermined safety radius of the arbitrary object; and
    a stationary traffic control device located at an intersection or crossing is wirelessly coupled to each traffic-monitoring device to receive a traffic stopping command generated by the traffic-monitoring device of the arbitrary object;
    wherein current trajectory data associated with each respective traffic-monitoring device is generated based upon time-dependent inertial (TDI) data, wherein the TDI data includes a current position, a current velocity, a current direction, and a current orientation of each respective traffic-monitoring device relative to the earth;
    wherein the current trajectory data associated with at least one proximal object of the subset of proximal objects is compared to the current trajectory data associated with the arbitrary object to detect the potential traffic collision; and
    wherein the traffic stopping command is generated within the traffic-monitoring device of the arbitrary object and sent to the stationary traffic control device to instruct the stationary traffic control device to issue a traffic light to stop traffic.

15. The vehicle safety network system of claim 14, wherein the traffic-monitoring device of the arbitrary object comprises:
    a location-detection module for identification of the current position, the current velocity and the current direction of the traffic-monitoring device of the arbitrary object;
    an orientation determining module for detecting the current orientation of the traffic-monitoring device of the arbitrary object relative to the earth;
    a wireless communication module coupled to the location-detection module and the orientation determining module to receive the TDI data of the traffic-monitoring device of the arbitrary object to be transmitted to a differing one or more of the traffic-monitoring devices associated with the subset of proximal objects, wherein the wireless communication module couples to receive the TDI data from one or more differing traffic-monitoring devices of the subset of proximal objects;
    an alert-generating module coupled to the wireless communication module to receive the TDI data of the traffic-monitoring device of the arbitrary object and the TDI data of the one or more differing traffic-monitoring devices of the subset of proximal objects to detect the potential traffic collision based upon the intersection of current trajectory data associated with the traffic-monitoring device of the arbitrary object and at least one of the one or more differing traffic-monitoring devices of the subset of proximal objects;
    wherein, in response to detection of the potential traffic collision, the alert-generating module generates the traffic stop command and sends the traffic stop command to the wireless communication module.

16. The vehicle safety network system of claim 15, further comprising:
    an image capturing module coupled to the wireless communication module;
    wherein, the alert-generating module constantly monitors the current orientation of the traffic-monitoring device of the arbitrary object to detect an accident based upon an off-plumb safety threshold and generates an emergency notification, when an off-plumb angle detected by the orientation determining module is greater than or equal to the off-plumb safety threshold;
    wherein, in response to the detected accident, the image capturing module generates an image of an area surrounding the traffic-monitoring device of the arbitrary object;
    wherein, in response to the generated image, the wireless communication module sends the image to a cellphone tower to wirelessly communicate with users listed in an emergency list.

17. A traffic-monitoring device, comprising:
    a location-detection module for identification of a current position, a current velocity and a current direction of the traffic-monitoring device;
    an orientation determining module for detecting a current orientation of the traffic-monitoring device relative to the earth;
    a wireless communication module coupled to the location-detection module and the orientation determining module to receive time-dependent inertial (TDI) data to be transmitted to a plurality of differing traffic-monitoring devices, wherein the TDI data includes the current position, the current velocity, the current direction, and the current orientation of the traffic-monitoring device relative to the earth, and wherein the wireless communication module couples to receive TDI data from the plurality of differing traffic-monitoring devices;
    an alert-generating module coupled to the wireless communication module to receive the TDI data and the TDI data of the plurality of differing traffic-monitoring devices to detect a potential traffic collision based upon the intersection of current trajectory data associated with the traffic-monitoring device and at least one of the plurality of differing traffic-monitoring devices, wherein the alert-generating module derives the current trajectory data from the TDI data and the TDI data of the at least one of the plurality of differing traffic-monitoring devices, and the current trajectory data represents a past position, a current position and a future position;

wherein, in response to detection of the potential traffic collision, the alert-generating module generates a traffic stop command and sends the traffic stop command to the wireless communication module;

wherein, the wireless communication module couples to a stationary traffic control device located at an intersection or crossing to transmit the traffic stop command for stopping traffic.

18. The traffic-monitoring device of claim 17, further comprising:

an image capturing module coupled to the wireless communication module;

wherein, the alert-generating module constantly monitors the current orientation of the traffic-monitoring device to detect an accident based upon an off-plumb safety threshold and generates an emergency notification, when an off-plumb angle detected by the orientation determining module is greater than or equal to the off-plumb safety threshold;

wherein, in response to the detected accident, the image capturing module generates an image of an area surrounding the traffic-monitoring device;

wherein, in response to the generated image, the wireless communication module sends the image to a cellphone tower to wirelessly communicate with users listed in an emergency list.

19. The traffic-monitoring device of claim 18, further comprises:

a module that generates a synthetic vision system based upon the image, wherein the synthetic vision system is a three dimensional rendering of the area surrounding the traffic-monitoring device at the time of the detected accident.

* * * * *